Patented July 22, 1947

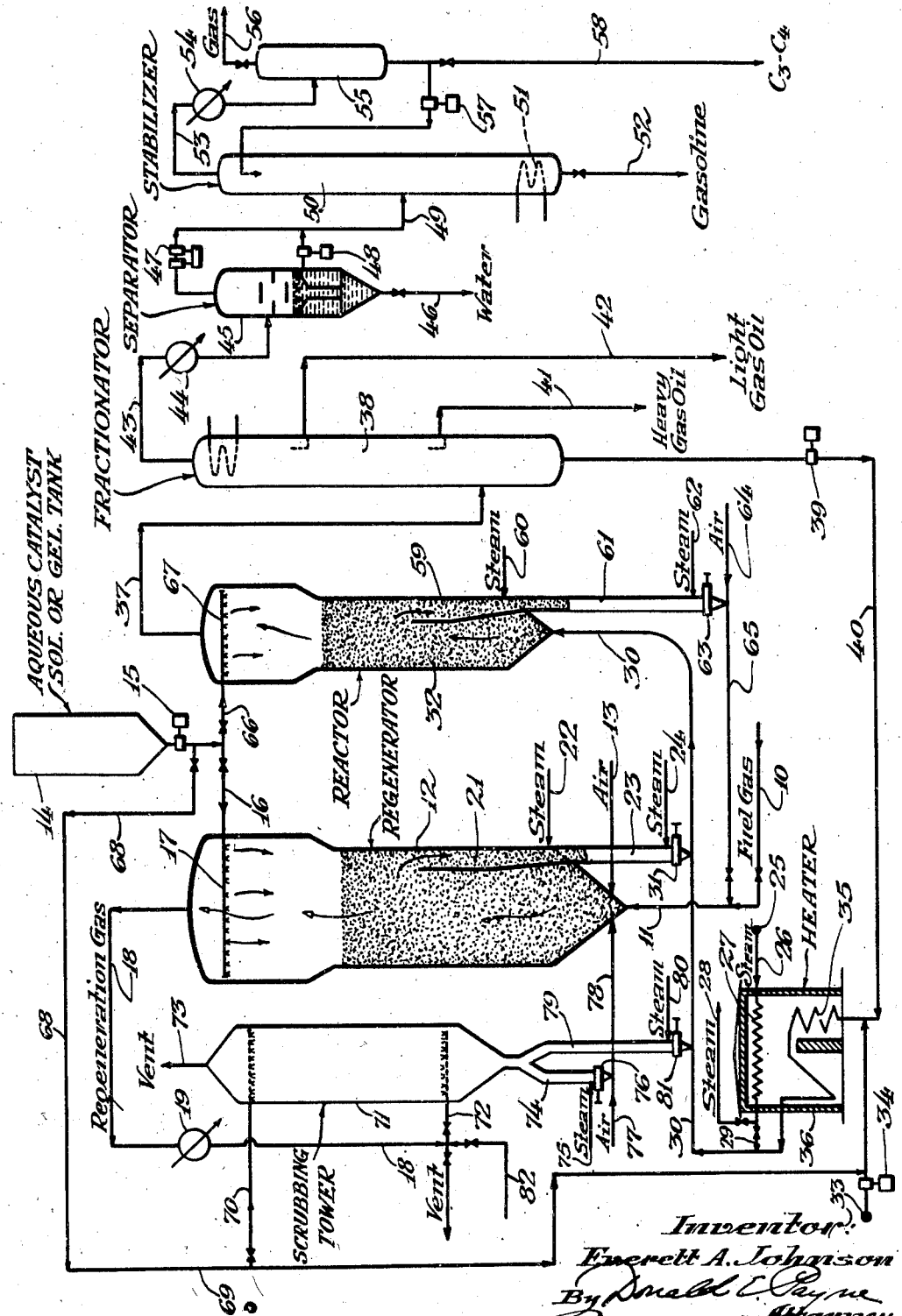

2,424,467

UNITED STATES PATENT OFFICE 2,424,467

CATALYTIC CONVERSION AND CATALYST DRYING

Everett A. Johnson, Park Ridge, Ill., assignor to Standard Oil Company, Chicago, Ill., a corporation of Indiana Application February 28, 1942, Serial No. 432,837

8 Claims. (Cl. 196—52)

This invention relates to catalytic conversion systems of the powdered or so-called "fluid-type" and it pertains more particularly to an improved method and means for drying and activating catalyst which is introduced thereto.

A fluid-type catalytic conversion system is one in which a powdered catalyst effects conversion while suspended in a gas or vapor stream, the catalyst is then separated from reaction gases and vapors, stripped with an inert gas such as steam, and suspended in a gas mixture for regeneration. The regenerated catalyst is then separated from regeneration gases and resuspended in the original gas or vapor stream for effecting further conversion. My invention relates to an improved method and means for introducing make-up catalyst into this system.

The invention pertains particularly to the separation and use of gel-type catalysts such as silica gel, alumina gel, plural gels, etc. and to sols from which said gels would normally be formed. Heretofore gel-type catalysts have been dried at a temperature of about 200 to 250° F., then carefully heated to a temperature of about 900 to 1000° F. and maintained at that temperature for a substantial period of time to further dehydrate and activate the catalyst before it is actually introduced into a conversion system. The catalyst particles themselves have been prepared in various ways including pelleting or extruding the gel or slurries of powdered catalysts. In either case the catalyst is dried in contact with restricting surfaces. Such preformed catalyst particles fracture during use because of the strains resulting from the connate internal stresses produced on shrinking. The gel-type catalyst also has been prepared by partially dehydrating the gel, breaking up the gel, and completing the dehydration of the particles. Usually the final product has had to be pulverized or ground to obtain the desired particle size. Obviously uniform particle size is difficult to obtain by this means. An object of my invention is to make a heat-stable catalyst of uniform particle size, to avoid drying the catalyst in contact with restricting surfaces, to avoid grinding or pulverizing of the catalyst fragments, and to avoid the many difficulties which have been incident to prior methods of catalyst activation. A further object is to provide an improved method and means for activating catalyst in situ in the fluid-type system itself. A further object is to provide an improved method and means for recovering catalyst fines from hot gases or vapors. Other objects will be apparent as the detailed description of the invention proceeds.

In practicing my invention I may introduce an aqueous catalyst sol or gel directly into a reactor, regenerator or other part of the conversion system so that the water is vaporized therefrom while the sol or gel is suspended in hot gases or vapors. When such aqueous sol or gel is atomized at the top of a reactor or regenerator the vaporization of the water therefrom abstracts a considerable amount of heat from the gas or vapor stream at that point in the system and the cooling of these gases more than compensates for the added volume of steam in reducing the gas volume at that point. The reduction of gas volume in turn lowers the vertical gas or vapor velocity and facilitates settling of the catalyst particles out of the upflowing gas stream.

I may introduce the aqueous sol or gel into the charging stock entering the pipe still so that the freshly formed catalyst is dehydrated and activated simultaneously with the vaporization of the charging stock and at the same time is suspended in charging stock vapors. I may use the aqueous sol or gel for scrubbing partially cooled regeneration gas in order to recover catalyst fines therefrom at the same time that the introduced sol or gel is being dehydrated. In all cases the direct introduction of the aqueous sol or gel avoids any possibility of the contamination which was so difficult to avoid in all prior catalyst activation systems. No special drying and heating equipment is required for the catalyst preparation. The catalyst which is dehydrated and activated in situ in the system is in an extremely fine state of subdivision and highly active for effecting the desired conversion.

An outstanding feature of my invention is the use of freshly formed catalyst sols or gels before they have been substantially dehydrated and before they have reached the brittle state. Once the catalyst has been dehydrated and activated it is maintained in a dry state and maintained in fluent form by suitable aeration. I do not propose to introduce a slurry of already activated catalyst material into an oil stream entering the pipe still or into a vapor stream leaving the pipe still; if the catalyst can be handled as a powder, I prefer to handle it as such. It is known that aqueous or oil slurries of powdered solids may be introduced into the oil stream entering pipe still coils or into the vapors leaving said coils but my invention sharply distinguishes from such practice. The bulk of the catalyst which is introduced into my vaporized charging stock is catalyst withdrawn as aerated solids directly from the regenerator and it is desirable to retain such catalyst at substantially regeneration temperature to avoid the cooling of the catalyst which would be required for making it into a slurry. My invention has to do with freshly formed catalyst which has not yet reached the brittle state but which remains as a sol or soft gel which is sufficiently fluent so that it may be handled as a liquid. The water content of such sol or gel may be in the approximate range of 30 to 300 mols of water per mol of solids.

While the invention primarily relates to the drying and activation of freshly formed catalyst material, distinctly advantageous results are obtainable by introducing an aqueous slurry of catalyst at the top of reactor or regenerator even when the slurry is made from a catalyst which has already been activated or regenerated. As above pointed out, the introduction of an aqueous stream at this point in the fluid system tends to cause a decrease in gas or vapor volume which facilitates the settling out of catalyst from the gases or vapors leaving the reactor or regenerator chamber.

The invention will be more clearly understood from the following detailed description read in conjunction with the accompanying drawing which forms a part of the specification and which is a schematic flow diagram showing the application of my invention to a fluid-type catalytic cracking system.

The invention is applicable to conversion systems generally, i. e., to systems for hydrogenation, dehydrogenation, alkylation, hydroforming, reforming, gas reversion, isomerization, polymerization, desulfurization, synthesis, dehydration, oxidation, reduction, etc. The application of the invention to these various processes will be apparent from the following description of its application to a catalytic cracking process.

The charging stock for the catalytic cracking process may be a gas oil, reduced crude or heavier hydrocarbons from petroleum or other source. Instead of virgin charging stock I may employ cracked stocks or the so-called cycle stocks, i. e., hydrocarbons which have been produced in a previous thermal or catalytic cracking system. Also, I may employ hydrocarbons produced by the hydrogenation of carbonaceous materials or by the synthesis of carbon monoxide with hydrogen (the so-called Fischer Process).

In this specific example I will describe the use of a gel-type silica-alumina catalyst prepared by forming a gel from dilute sodium silicate in the presence of an aluminum salt by the addition of excess dilute sulfuric acid, boiling the resulting gel for an hour or two with an excess of ammonium hydroxide solution and then washing the boiled gel for the removal of sodium ions. The washed gel may contain as much as 300 mols of water per mol of silica and is so soft that when broken into pieces it flows together like a viscous liquid. When the water content of this gel is reduced to about 30 mols per mol of silica the gel becomes brittle and behaves more like a true solid. I prefer to avoid the dehydration of the gel to this brittle state and to introduce it into the system in the soft, plastic or semi-fluid state. In any event the catalyst retains a sufficiently high water content so that it may be handled as a true fluid as distinguished from a slurry of hard or abrasive solid particles.

In starting up the system I may use a catalyst which has already been dried and activated and I may limit the application of my present invention to the addition of make-up catalyst. Alternatively, I may introduce a fuel gas from line 10 through line 11 to regenerator 12 and I may effect combustion of this fuel gas in the regenerator by means of air introduced through line 13. The freshly formed aqueous catalyst sol or gel from source 14 may be charged by pump 15 through line 16 and dispersing or suspending means 17 into the top of the regenerator. The catalyst thus becomes dehydrated and activated in situ and the combustion gases leave the top of the regenerator through line 18, pass through waste heat boiler 19 and then may be vented.

The particle size of the silica-alumina catalyst which is thus activated in regenerator 12 may be of the order of 1 to 80 microns or more. While such particle sizes are employed in the specific examples herein described, it should be understood that particle size of 30 mesh or larger may be prepared by my method. The vertical gas velocities in the regenerator may be of the order of about .3 to 3 feet per second so that the dried and activated catalyst will gradually accumulate until a dense turbulent suspended catalyst phase is formed having a bulk density within the approximate range of 5 to 25 pounds per cubic foot. When this dense aerated catalyst has reached the desired level in the regenerator it may be withdrawn through stripping zone 21 at the base of which steam is introduced through line 22. Stripped catalyst then passes through standpipe 23 wherein it is maintained in aerated form by steam introduced through line 24. Steam from source 25 may pass through line 26 to coils 27 and thence may be distributed by line 28 throughout the system for supplying the necessary aeration and stripping steam. A part of the steam from coils 27 may be passed through line 29 and line 30 for picking up activated catalyst which is discharged from the base of standpipe 23 in amounts regulated by valve 31 and for carrying this catalyst to reactor 32.

When a sufficient amount of catalyst has accumulated in the reactor, charging stock from source 33 is introduced by pump 34 through coils 35 of pipe still 36 and thence through line 30 to the reactor so that it is the charging stock vapors or a mixture of such vapors with steam which picks up the catalyst from the base of standpipe 23 and carries it to the reactor. The catalyst-to-oil weight ratio in line 30 may be within the approximate range of .2:1 to 20:1 and may, for example, be about 4:1. The temperature in the reactor may be about 750 to 1000° F. and the pressure about atmospheric to about 25 pounds or more per square inch. The weight space velocity in the reactor, i. e., the weight of oil charged per hour per weight of catalyst in the reactor at any instant may range from about .2 to 10 or more and may, for example, be about 2.

Reaction products leave the top of the reactor through line 31 and are introduced near the base of fractionator tower 38. Any residual catalyst material in the reaction products is scrubbed out of the gases and vapors in the bottom of this tower and the heavy condensate containing such catalyst particles may be recycled by pump 39 and line 40 back to coils 36 of the pipe still. A heavy gas oil fraction may be withdrawn through line 41 and a light gas oil fraction through line 42. Gasoline and lighter products may be taken overhead through line 43 and cooler 44 to separator 45. Water may be withdrawn from the base of this separator through line 46. Gases from the top of the separator are compressed by compressor 47 and liquids from an intermediate point are pumped by pump 48 at a pressure of about 100 to 300 pounds per square inch and introduced through line 49 to stabilizer tower 50 which is provided with heating means 51 at its base. Stabilized gasoline may be withdrawn through line 52. Gases taken overhead through line 53 pass through cooler 54 to receiver 55. Uncondensed gases may be discharged from the top of this receiver through line 56. A part of the gases may be returned by pump 57 to serve as reflux in the top of the stabilizer and a C3—C4 fraction may be withdrawn from the system through line 58. This fractionation system is given by way of example and not by way of limitation and it should be understood that any other suitable fractionation system may be employed.

Deactivated catalyst is withdrawn from the dense phase in reactor 32 at substantially the same rate as catalyst is introduced into the reactor. The withdrawn catalyst passes through stripping zone 59 at the base of which steam is introduced through line 60. It then passes through standpipe 61 wherein the catalyst is maintained in fluent form by aeration steam introduced by line 62. Catalyst is discharged from the base of standpipe 61 in amounts regulated by valve 63, is picked up by air from line 64 and conveyed by line 65 and line 11 to the regenerator, the valve in the fuel gas line 10 being of course closed at this time.

The regenerator 12 may be of the same general design as reactor 32 but is usually at least three or four times as large as the reactor. Both of these chambers should be designed to provide a vertical gas or vapor velocity within the approximate range of .3 to 3 feet per second in order to maintain the desired dense phase catalyst conditions therein. Regenerated catalyst leaves the regenerator through stripping zone 21 and standpipe 23 and is returned to the reactor in the manner already herein described.

The upper part of the reactor and regenerator are preferably enlarged in order to decrease the vertical vapor velocity of gases and vapors and thus facilitate the settling of catalyst particles back into the dense phase of catalyst. The separation of catalyst from exit gases or vapors may be augmented by the use of suitable screens, cyclone separators or other known separation devices. By lowering the vertical vapor velocity in the top of these chambers however a very efficient separation of catalyst may be obtained by simple settling.

In normal operation about .2 to 2 pounds of catalyst is lost from the system for each barrel of charging stock introduced thereto and this catalyst must continuously be replaced by the addition of make-up catalyst. A feature of my invention is the addition of this make-up catalyst in freshly formed state before it has been dehydrated to the extent that it becomes hard and brittle. An aqueous catalyst sol or gel may thus be sprayed in the top of the regenerator by distributing means 17 as already described. The vaporization of water at this point in the regenerator effects a marked cooling of regenerator gases and produces an over-all decrease in gas volume thus lowering the vertical gas velocity in the enlarged upper part of the regenerator. The catalyst is almost instantaneously dehydrated and activated and is in the finely divided form desired in the system.

Instead of adding make-up catalyst to the top of the regenerator I may add it through line 66 and distributors 67 into the top of the reactor, thus minimizing the catalyst carry-over through line 37 and acting as a reflux to knock back any heavy hydrocarbon materials which have not been sufficiently cracked.

The aqueous, freshly formed catalyst sol or gel may be introduced through lines 68 and 69 to the hydrocarbon stream entering coils 35. It is desirable that a small amount of powdered catalyst be passed through the coils with the charging stock since this tends to keep the tubes free from coke deposits. It is undesirable to introduce a large amount of catalyst solids at this point because of the erosion of pipe still coils caused by the abrasive action of such solids.

The major part of catalyst losses from the system are apparently with regeneration gases and in order to minimize such losses I may introduce the make-up aqueous catalyst sol or gel through line 70 to the top of scrubbing tower 71 and I may pass partially cooled regeneration gases from line 18 through line 72 to a lower point in this scrubbing tower. Here again the aqueous catalyst sol or gel is dehydrated while it is suspended in upflowing gases so that it is in finely divided powdered form by the time it reaches the base of the scrubber. The down-coming spray tends to adsorb any residual catalyst particles in the upflowing regeneration gas so that the regeneration gas which is vented through line 73 may be substantially free from catalyst particles. Further recovery of catalyst particles may be effected by the use of electrostatic precipitators, or by scrubbing the regeneration gases with incoming charging stock.

Alternatively or additionally a fuel gas may be introduced by line 82 into tower 71 and I may effect combustion of this fuel gas to supply heat in the tower, for example in starting up the unit. The catalyst thus becomes dehydrated, activated and preheated in tower 71 and can be cycled to the regenerator or reactor in the heated condition.

Catalyst from the base of scrubber 71 may pass through standpipe 74 which is aerated by air introduced through line 75. This catalyst may be discharged from the base of the standpipe in amounts regulated by valve 76, picked up by air introduced through line 77 and returned through line 78 to the regenerator. Alternatively, it may pass through standpipe 79 which is aerated by steam introduced through line 80 and it may be discharged in amounts regulated by valve 81 into line 30.

If desired the scrubber 71 can be operated under such temperature conditions as only partially to dehydrate the gel and to recover the catalyst fines from the cooled regeneration gases. The enriched partially dehydrated gel may then be injected into the regenerator or reactor or hydrocarbon transfer line as herein described.

It will be seen from the above description that in all cases the freshly prepared aqueous catalyst sol or gel is dehydrated and activated in the catalytic conversion system itself so that there is no chance of its being contaminated in external dryers or heaters. Likewise the catalyst is dehydrated in a suspension of heated gaseous vapors out of contact with any restricting surfaces whereby connate internal stresses are avoided and uniform particles are obtained. The resultant catalyst is heat-stable and active. Furthermore, the dehydration of the catalyst removes heat from the conversion system at points where heat absorption is highly desirable and the over-all efficiency of the systems is thus markedly improved.

As above indicated the make-up catalyst may be either in the form of a sol or a soft hydrogel of large water content. For cracking, this sol or gel may be simply silica sol or silica gel although I prefer to employ a small amount of co-gelled alumina or other additive admixed therewith. For dehydrogenation or aromatization and other conversion processes I may employ an aqueous catalyst sol or gel as described, for example, in U. S. Patents Nos. 2,274,633-4. In this case the alumina sol is prepared directly from metallic aluminum and since it contains no objectionable ions, no washing step is required so that the sol itself may be introduced into the conversion system before gelation. The sol or gel may, of course, contain ammonium paramolybdate, ammonium chromate, or other suitable compounds of metals which are to cooperate with the alumina in the formation of the final catalyst. Since no invention is claimed in any particular catalyst sol or gel per se or in the method of preparing such sols and gels a further description thereof is unnecessary.

Although I have described my invention in terms of the introduction of particular catalyst materials, it is to be understood that a plurality of catalyst materials and/or inert diluent materials may be added by this technique. Likewise, tower 71 can be operated to pretreat or preheat the introduced material prior to its introduction in the fluid state into the conversion system.

While my invention has been described in connection with a specific conversion process it should be understood that it is not limited to such process or to the described apparatus or to the specific operating conditions hereinabove set forth since numerous modifications of the system and alternative methods will be apparent to those skilled in the art from the above detailed description.

I claim:
1. The method of dehydrating a hydrous synthetic catalyst of gel structure produced from an aqueous catalyst sol which method comprises preparing a catalyst sol containing at least 30 mols but not more than 300 mols of water per mol of catalyst solid, suspending a fluent mass of said catalyst after it has reached the sol state but before it has reached a hard solid gel state into a fluid stream of combustion gases in a catalytic conversion system and removing water from said catalyst while said catalyst is suspended in said fluid stream.

2. The method of dehydrating a hydrous synthetic catalyst of gel structure produced from an aqueous sol which method comprises preparing an aqueous catalyst sol which on standing would set into a solid gel and which contains at least 30 mols of water per mol of catalyst solid, and dispersing said catalyst before it reaches the solid state into a heated flowing fluid stream consisting essentially of combustion products, whereby particles of said hydrous catalyst are suspended in said stream, gelling said catalyst while it is suspended in said stream, dehydrating said gelled catalyst out of contact with restricting surfaces and under conditions to avoid connate internal stresses and to produce uniform heat-stable and catalytically active particles, and separating said dehydrated catalyst from said stream.

3. The method of effecting catalytic conversion which comprises passing a gaseous stream upwardly through a mass of solid catalyst particles of small particle size at such rate within the approximate range of .3 to 3 feet per second as to maintain said catalyst in turbulent dense phase suspension, settling catalyst particles from ascending gases back to said dense phase in the upper part of said zone, directly injecting into said upper part of said zone an aqueous fluent mass of catalyst material which if permitted to stand would set into a solid gel, removing water from the introduced catalyst material while it is suspended in said gaseous stream whereby the introduced catalyst is substantially dehydrated, admixing the dehydrated catalyst with the dense phase of catalyst material in the contacting zone and withdrawing catalyst as a downwardly moving column from said contacting zone.

4. The method of effecting catalytic conversion which comprises suspending catalyst solids of small particle size from the base of a downwardly moving aerated column into a charging stock stream, introducing said charging stock stream at a low point in a conversion zone, maintaining an upward gas velocity in said conversion zone sufficiently low to maintain a dense turbulent phase of suspended catalyst therein, transferring catalyst from said dense phase in said conversion zone to a stripping zone, stripping said catalyst with an inert gas in said stripping zone, removing the catalyst as a downwardly moving aerated column from said stripping zone, suspending catalyst from the base of said last-named column in a regeneration gas stream, introducing said regeneration gas stream with suspended catalyst at a low point in a regeneration zone, passing regeneration gases upwardly in said regeneration zone at a sufficiently low velocity to maintain a suspended dense turbulent phase of catalyst therein, withdrawing catalyst from said last-named dense phase to said first-named aerated column, maintaining a catalyst settling space above the dense catalyst phase in the conversion zone and in the regeneration zone respectively, introducing into at least one of said settling spaces an aqueous catalyst sol containing at least about 30 mols of water per mol of catalyst solid, and effecting said introduction of catalyst sol before said sol has reached a solid gel state whereby it may be dispersed in upflowing gases in the settling zone and dehydrated while thus dispersed and suspended, whereby the vaporization of water from the introduced sol effects cooling in said settling zone, and whereby solids are scrubbed out of ascending vapors by said introduced sol.

5. In a catalytic conversion process wherein solid synthetic catalyst of gel structure and small particle size is suspended as a dense turbulent phase in a gasiform charging stock stream in a first contacting zone under conversion conditions, catalyst is separated from said stream in the upper part of said first contacting zone at a temperature higher than the boiling point of water, catalyst from the first contacting zone is suspended in a regeneration gas stream which passes through a second contacting zone to form a dense catalyst phase therein, catalyst is separated from the regeneration gas stream in the upper part of said second contacting zone at a temperature higher than the boiling point of water, and catalyst from the second contacting zone is resuspended in the gasiform stream which passes through the first contacting zone, the improved method of operation which comprises, adding a make-up catalyst sol containing a large amount of water directly into the upper part of at least one of said contacting zones above the dense catalyst phase therein so that the water will be vaporized and a cooling effect will be produced, removing the vaporized water together with the cooled gasiform stream from the upper part of the contacting zone into which the make-up catalyst sol is introduced, combining the introduced catalyst from which water is vaporized with catalyst already present in the upper part of said contacting zone, and returning the combined catalyst to the dense catalyst phase therein.

6. In a process wherein a gasiform stream is contacted with a moving mass of solid synthetic catalyst of gel structure and small particle size under conditions of time, temperature and pressure for effecting conversion in which contacting step the catalyst is maintained in dense phase condition, the improvement which comprises employing therein catalyst particles prepared by passing a hot gas through a vertical drying zone of large cross-sectional area, dispersing in said drying zone a fluent mass of synthetic catalyst material after it has reached a sol state and before it has reached a solid gel state, and passing said dispersed catalyst material downwardly through said gas in said drying zone to effect dehydration while said material is in gas suspension and out of contact with the restricting surfaces whereby internal stresses are avoided in dehydrated catalyst particles and uniform catalyst particles are produced.

7. In a catalytic conversion process which comprises suspending catalyst solids of small particle size from the base of a downwardly moving aerated column into a charging stock stream, introducing said charging stock stream at a low point in a conversion zone, maintaining an upward gas velocity in said conversion zone sufficiently low to maintain a dense turbulent phase of suspended catalyst therein, transferring catalyst from said dense phase in said conversion zone to a stripping zone, stripping said catalyst with an inert gas in said stripping zone, removing the catalyst as a downwardly moving aerated column from said stripping zone, suspending catalyst from the base of said last-named column in a regeneration gas stream, introducing said regeneration gas stream with suspended catalyst at a low point in a regeneration zone, passing regeneration gases upwardly in said regeneration zone at a sufficiently low velocity to maintain a suspended dense turbulent phase of catalyst therein, withdrawing catalyst from said last-named dense phase to said first-named aerated column, and maintaining a catalyst settling space above the dense catalyst phase in the conversion zone and in the regeneration zone respectively, the improvement which comprises employing in said process catalyst particles prepared by the steps of passing a hot gas through a vertical drying zone of large cross-sectional area, dispersing into said hot gas at the top of said drying zone a fluent mass of synthetic catalyst material after it has reached a sol state and before it has reached a solid gel state, and passing said dispersed catalyst material downwardly through said gas in the drying zone to effect dehydration of said material while said material is in gas suspension and out of contact with restricting surfaces whereby internal stresses in resulting catalyst particles are avoided and small uniform catalyst particles are produced.

8. A process for the conversion of hydrocarbons which comprises flowing hydrocarbon reactants at reaction temperature in contact with a dense moving confined stream of solid catalyst of small particle size and employing in said process catalyst particles prepared by passing a hot gas through a drying zone of large cross-sectional area, dispersing in said drying zone a fluent mass of synthetic catalyst material after it has reached a sol state and before it has reached a solid gel state, and passing said dispersed catalyst material downwardly through said gas in said drying zone to effect dehydration while said material is in gas suspension and out of contact with restricting surfaces whereby internal stresses are avoided in dehydrated catalyst particles and uniform catalyst particles are produced.

EVERETT A. JOHNSON.

REFERENCES CITED

The following references are of record in the file of this patent:

UNITED STATES PATENTS

| Number | Name | Date |
| --- | --- | --- |
| 1,614,660 | Darlington | Jan. 18, 1927 |
| 1,799,858 | Miller | Apr. 7, 1931 |
| 2,237,339 | de Florez | Apr. 8, 1941 |
| 2,288,395 | Ellis | June 30, 1942 |
| 2,303,680 | Brueckmann | Dec. 1, 1942 |
| 2,161,974 | Peck | June 13, 1939 |
| 2,292,708 | Mavity | Aug. 11, 1942 |
| 2,308,792 | Thomas | Jan. 19, 1943 |
| 2,327,175 | Conn | Aug. 17, 1943 |
| 2,274,633 | Pitzer et al. | Mar. 3, 1942 |
| 2,274,634 | Heard | Mar. 3, 1942 |
| 1,755,496 | Behrman | Apr. 22, 1930 |
| 1,835,420 | Neundlinger | Dec. 8, 1931 |
| 1,843,576 | McClure et al. | Feb. 2, 1932 |
| 2,229,353 | Thomas et al. | Jan. 21, 1941 |
| 2,319,710 | Stratford et al. | May 18, 1943 |